Patented June 15, 1943

2,321,586

UNITED STATES PATENT OFFICE 2,321,586

REACTION PRODUCT OF A POLYMETHYLOL MELAMINE AND A HALOGENATED ACETAMIDE

Gaetano F. D'Alelio, Pittsfield, Mass., assignor to General Electric Company, a corporation of New York No Drawing. Application February 14, 1941, Serial No. 378,933

14 Claims. (Cl. 260—42)

This invention relates to the production of new and useful synthetic compositions. More particularly the invention is concerned with novel synthetic resins obtained by reaction of ingredients comprising a preformed poly-methylol melamine, e. g., di-, tri-, tetra-, penta- and hexa-methylol melamines, and a halogenated acetamide, e. g., mono-, di- and tri-chloracetamides, mono-, di- and tri-bromacetamides, etc.

This application is a continuation-in-part of my copending applications Serial Nos. 371,393, 371,394 and 371,395, all of which applications were filed December 23, 1940 and are assigned to the same assignee as the present invention.

It has been known heretofore that resinous materials can be prepared by effecting reaction between an aminotriazine and an aldehyde, e. g., formaldehyde. The suggestion also has been made that acetamide be incorporated into an aminoplast resin, specifically a urea-formaldehyde resinous condensation product, in order to plasticize the resin. Such plasticized resins and molding compositions made therefrom require the addition of a direct (active) or a latent curing catalyst in order to accelerate their conversion to an insoluble and infusible state and to render them practically useful in the plastics arts.

In my above-identified copending applications I showed that resinous products having particularly valuable properties could be produced by effecting reaction between an aminotriazine, e. g., melamine, and a preformed poly-(N-carbinol) derivative of a urea, e. g., preformed dimethylol urea, and that the fundamental resins may be modified with other materials including the N-carbinol derivatives of the aminotriazines, e. g., the methylol melamines (Serial No. 371,393); also, by effecting reaction between a preformed poly-(N-carbinol) derivative of a urea and a preformed mono- or poly-(N-carbinol) derivative of an aminotriazine (Serial No. 371,394); also, by effecting reaction between a urea and a preformed poly-(N-carbinol) derivatives of a urea, the reaction products of which may be modified, if desired, with a N-carbinol derivative of an aminotriazine (Serial No. 371,395). I further disclosed in the above-identified copending applications that various curing reactants, including halogenated acetamides, specifically mono-, di- and tri-chloracetamides, when intercondensed with the above partial reaction products, caused the potentially reactive resinous syrup rapidly to convert to an insoluble, infusible state when subjected to an elevated temperature, e. g., 100° to 200° C.

The present invention is based on my discovery that novel synthetic resins of particular value in the plastics and coating arts can be prepared by effecting reaction between ingredients comprising essentially a preformed polymethylol melamine, specifically trimethylol melamine, and a halogenated acetamide. The reaction may be carried out under acid, neutral or alkaline conditions, at normal or at elevated temperatures, at atmospheric, sub-atmospheric or super-atmospheric pressures, and in the presence or absence of solvents, diluents, fillers, plasticizers, other natural or synthetic resins or resin-forming materials, etc. These new resins are characterized by their high resistance to water in cured state as compared with the ordinary, cured melamine-formaldehyde resins. Furthermore, the heat-convertible resinous syrups and molding compounds prepared therefrom have excellent time- or storage-stability, that is, they can be stored for long periods of time without materially advancing toward the insoluble, infusible state. Also, at temperatures of the order of 100° to 200° C. the resins and molding compounds of this invention convert rapidly to the insoluble and infusible or cured state without the addition of direct or active curing catalysts or of latent curing accelerators. This was quite surprising and unexpected, since resinous reaction products of preformed polymethylol melamine and acetamide show no accelerated curing characteristics when heated at 100° to 200° C.

In order that those skilled in the art better may understand how the present invention may be carried into effect, the following illustrative examples thereof are given. All parts are by weight.

*Example 1*

| | Parts |
|---|---|
| Preformed trimethylol melamine | 108.0 |
| Chloracetamide (monochloracetamide) | 1.0 |
| Water | 120.0 |

The preformed trimethylol melamine was added to the water and the resulting mixture was heated under reflux at the boiling temperature of the mass for 20 minutes. Then the chloracetamide was added and reaction between the chloracetamide and the preformed trimethylol melamine was effected by heating the components together under reflux for 5 minutes. A heat-hardenable resinous syrup was obtained. When a small sample of this syrup was heated on a 140° C. hot plate, it cured very rapidly to an insoluble, infusible state.

A molding (moldable) compound was made by mixing the syrup produced as described above with 70 parts alpha cellulose in flock form and 0.4 part of a mold lubricant, specifically zinc stearate. The wet compound was dried at 64° C. for 1½ hours. The dried compound was molded for 4 minutes at 130° C. under a pressure of 2,000 pounds per square inch. The molded piece was well cured throughout, had an excellent surface appearance and good water resistance.

Example 2

| | Parts |
|---|---|
| Preformed trimethylol melamine | 108.0 |
| Dichloracetamide | 1.5 |
| Aqueous ammonia (28% NH₃) | 6.0 |
| Sodium hydroxide in 5 parts water | 0.1 |
| Water | 120.0 |

All of the above components with the exception of the dichloracetamide were heated together under reflux for 20 minutes, after which the dichloracetamide was added and refluxing was continued for an additional 5 minutes. The resin syrup, when tested on a 140° C. hotplate, cured rapidly to an insoluble, infusible state.

A molding compound was made as in Example 1. The wet compound was dried at 64° C. for 1¼ hours. Molding the dried compound for 5 minutes at 130° and 2,000 pounds per square inch pressure yielded a very well-cured molded article.

Example 3

The same formula and procedure were followed in making a resin syrup, molding composition and molded article as described under Example 2, with the exception that the sodium hydroxide catalyst was omitted and 1.5 parts trichloracetamide were used in making the resin syrup instead of 1.5 parts dichloracetamide. The resin syrup cured rapidly to an insoluble, infusible condition when a small sample of it was tested on a 140° C. hotplate. The molded article was hard and well cured throughout and was not attacked by boiling water.

Example 4

The same formula and procedure were followed in making a resin syrup, molding composition and molded article as described under Example 2 with the exception that 1.5 parts trichloracetamide were employed in preparing the resin syrup instead of 1.5 parts dichloracetamide and the molding compound was molded for only 4 minutes. The resin syrup was heat-convertible at 140° C. to an insoluble, infusible state. The molded piece was hard and well cured and showed good flow characteristics during molding.

Example 5

| | Parts |
|---|---|
| Preformed trimethylol melamine | 108.0 |
| Urea | 30.0 |
| Monochloracetamide | 1.0 |
| Aqueous ammonia (28% NH₃) | 6.0 |
| Sodium hydroxide in 5 parts water | 0.1 |
| Water | 150.0 |

All of the above components with the exception of the monochloracetamide were heated under reflux at the boiling temperature of the mass for 20 minutes, after which the chlorinated acetamide was added and refluxing was continued for an additional 10 minutes. The resulting syrup was heat-hardenable as evidenced by the fact that a small sample of it cured to an insoluble, infusible state when heated on a 140° C. hot plate.

A molding compound was prepared as described under Example 1. The wet compound was dried at 64° C. for 2½ hours. The dried compound was molded for 7 minutes at 130° C. under a pressure of 2,000 pounds per square inch. A well-cured molded article was obtained. The heat-hardened article had excellent water resistance and showed good flow characteristics during molding.

It will be understood, of course, by those skilled in the art that my invention is not limited to the specific components named in the above illustrative examples. Thus, instead of using monochloracetamide (ClCH₂CONH₂), dichloracetamide (Cl₂CHCONH₂) or trichloracetamide (Cl₃CCONH₂), alone or mixed with one another, I may use any other halogenated acetamide, or mixture thereof, e. g., monobromacetamide, dibromacetamide, tribromacetamide, mixtures of brominated acetamides, mixtures of chlorinated and brominated acetamides, etc. The choice of the halogenated acetamide is dependent largely upon economic considerations and the particular properties desired in the final product. For example, when light-colored molded articles are desired the use of the iodo derivatives should be avoided; and when the resinous reaction product is to be used in the production of molding compositions, the fluorinated acetamides preferably are not employed. I prefer to effect reaction between ingredients comprising, by weight, a preponderant proportion of a preformed polymethylol melamine (or a mixture of preformed polymethylol melamines) and a minor proportion of a chlorinated acetamide (or a mixture of chlorinated acetamides).

If a condensation catalyst is used to accelerate the condensation reaction between the components, I prefer to use an alkaline or basic condensing agent. Condensation catalysts having excellent storage stability characteristics can be obtained by causing the condensation reaction to take place in the presence of a condensation catalyst comprising a primary condensation catalyst and a secondary condensation catalyst. As the primary catalyst advantageously may be used a nitrogen-containing basic compound, e. g., ammonia, primary amines (e. g., ethyl amine, propyl amine, etc.), secondary amines (e. g, dipropyl amine, dibutyl amine, etc.) and tertiary amines such as trialkyl (e. g., trimethyl, triethyl, etc.) amines, triaryl (e. g., triphenyl, etc.) amines, etc. The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.). Thus, resinous products of exceptional storage stability may be obtained by causing ingredients comprising essentially preformed polymethylol melamine, specifically preformed trimethylol melamine, and a halogenated acetamide, specifically a chlorinated acetamide, to react in the presence of a condensation catalyst comprising a relatively small amount of ammonia and a lesser but substantial amount of a fixed alkali, for example sodium or potassium hydroxide.

In producing my new compositions of matter comprising a reaction product of ingredients comprising a preformed polymethylol melamine and a halogenated acetamide, the ratio between the components may be varied as desired or as conditions may require. Usually the halogenated acetamide is used in an amount ranging from 0.001 to 0.2 mol of the halogenated amide for each mol of preformed polymethylol melamine. The use of a higher ratio of halogenated acetamide to preformed polymethylol melamine is not precluded, but no particular advantage ordinarily accrues from using more halogenated acetamide than required to impart the desired curing characteristics to the heat-convertible resin.

Instead of using a single preformed polymethylol melamine I may use a plurality of different preformed polymethylol melamines, e. g., a mixture of preformed trimethylol melamine with one or more of the following in preformed state: dimethylol melamine, tetramethylol melamine, pentamethylol melamine or hexamethylol melamine. Good results are obtained with preformed polymethylol melamines at least one of which is preformed trimethylol melamine. I prefer to use preformed trimethylol melamine as the sole polymethylol melamine reactant.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; mono- and poly-amides, e. g., formamide, acetamide, stearamide, acrylo-amides, benzamide, toluene sulfonamide, benzene disulfonamide, benzene trisulfonamide, malonic diamide, itaconic diamide, fumaric diamide, maleic diamide, adipic diamide, phthalamide, urea, thiourea, selenourea, iminourea, substituted ureas, thioureas, selenoureas and iminoureas, numerous examples of which are given in various copending applications of mine, for example in my copending application Serial No. 371,395, aminotriazines (amidogentriazines), e. g., melamine, ammeline, ammelide, numerous other examples of which are given in my various copending applications, for instance in my copending application Serial No. 371,393; methylol derivatives of, for example, monoamides, polyamides, aminotriazines other than melamine, etc., for example, monomethylol urea, dimethylol urea, etc.; amines, e. g., ethylene diamine, aniline, phenylene diamine, etc.; phenols, including aminophenols, etc.; ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, proteins, protein-aldehyde condensation products, urea-aldehyde resinous condensation products (e. g., a resinous reaction product of urea and formaldehyde), resinous condensation products of an active methylene-containing body, e. g., an aldehyde such as formaldehyde, with an aminodiazine, an aminopentadiazine or an aminotriazine, phenol-aldehyde condensation products, aniline-aldehyde condensation products, furfural condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl alcohol, polyvinyl esters, e. g., polyvinyl acetate, etc., polyvinyl ethers, including the polyvinyl acetals, e. g., polyvinyl formal, etc., polyvinyl ketones, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide compositions best fitted to yield molded articles of optimum properties for the particular service application.

The molding compositions of this invention may be molded into a wide variety of shapes under heat or under heat and pressure, more particularly at temperatures of the order of 100° to 200° C. For optimum results I prefer to use temperatures ranging from approximately 120° to 180° C. Molding pressures may be varied considerably, but usually are within the range of 1,000 to 10,000 pounds per square inch, more particularly from 2,000 to 4,000 or 5,000 pounds per square inch.

The modified or unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, and for binding or cementing together mica flakes to make a laminated mica article. They are particularly useful as fire retardants and sizings for cotton, linen and other cellulosic materials. They also may be used as impregnants for electrical coils. The cured products have excellent resistance to heat and water, and have a high dielectric strength and excellent arc resistance.

What I claim as new and desire to secure by Letters Patent of the United States is:

1. A composition comprising a reaction product of ingredients comprising a preformed polymethylol melamine and a halogenated acetamide.

2. A composition comprising a reaction product of ingredients comprising a preformed polymethylol melamine, an alcohol and a halogenated acetamide.

3. A heat-curable resinous composition comprising the product of reaction of ingredients comprising a preformed polymethylol melamine and a chlorinated acetamide.

4. A product comprising the cured resinous composition of claim 3.

5. A resinous composition produced by reaction of ingredients comprising, by weight, a preponderant proportion of preformed trimethylol melamine with a minor proportion of a chlorinated acetamide while admixed with a condensation catalyst comprising ammonia and a fixed alkali.

6. A resinous composition obtained by reaction, in the presence of an alkaline substance, of ingredients comprising a chlorinated acetamide and a preformed polymethylol melamine in the ratio of from 0.001 to 0.2 mol of the former to 1 mol of the latter.

7. A composition comprising the resinous reaction product of ingredients comprising a plurality of preformed polymethylol melamines at least one of which is preformed trimethylol melamine and at least one chlorinated acetamide.

8. A resinous composition obtained by reaction of ingredients comprising preformed trimethylol melamine and monochloracetamide.

9. A resinous composition obtained by reaction of ingredients comprising preformed trimethylol melamine and dichloracetamide.

10. A composition comprising (1) a resinous reaction product of ingredients comprising a preformed polymethylol melamine and a chlorinated acetamide, and (2) a urea-formaldehyde resinous condensation product.

11. A composition comprising the product of reaction of ingredients comprising a preformed polymethylol melamine, urea and a halogenated acetamide.

12. A heat-hardenable molding composition comprising a filler and a heat-curable reaction product of ingredients comprising preformed polymethylol melamine and a chlorinated acetamide.

13. An article of manufacture comprising the heat-hardened molding composition of claim 12.

14. The method of preparing new compositions of matter which comprises effecting reaction between ingredients comprising a preformed polymethylol melamine and a halogenated acetamide.

GAETANO F. D'ALELIO.